Oct. 1, 1968  R. ROSENTHAL  3,404,336
APPARATUS FOR MEASURING ELECTRICAL CONDUCTIVITY OF A FLUID
Original Filed July 26, 1965

INVENTOR
Robert Rosenthal
BY Charles H. Brown
ATTORNEY

United States Patent Office 3,404,336
Patented Oct. 1, 1968

3,404,336
APPARATUS FOR MEASURING ELECTRICAL
CONDUCTIVITY OF A FLUID
Robert Rosenthal, Tenafly, N.J., assignor to Beckman
Instruments, Inc., a corporation of California
Original application July 26, 1965, Ser. No. 474,655.
Divided and this application Jan. 25, 1968, Ser. No.
700,473
7 Claims. (Cl. 324—30)

ABSTRACT OF THE DISCLOSURE

Apparatus for determining the conductivity of an electrically conducting fluid such as a liquid, sludge, slurry, mud, oil and mixtures thereof with or without solids which utilizes a tubular closed loop having spaced inlet and outlet conduits communicating with said loop and having cross-sectional areas smaller than the cross-sectional area of a part of the tubular closed loop between said inlet and outlet. An alternating current input source and a measuring device are respectively coupled to different coils surrounding different portions of the loop.

---

This application is a division of copending application Ser. No. 474,655, filed July 26, 1965.

Background

It is known to measure the conductivity of an electrolyte by means of a pair of toroidal cores immersed in a solution. Certain problems involving stray leakage arise when the cores are physically immersed in the solution. In the past it has been known to employ two spaced electrodes immersed in the solution for measuring conductivity, but such an arrangement suffers from further disadvantages including the polarization of the electrodes while in use. U.S. Patent No. 2,542,057, granted Feb. 20, 1951, to M. J. Relis, proposes to overcome the foregoing difficulties by the use of means in the pickup circuit for compensating for the inductive effect of the stray field from the current setting up means.

An additional problem present in heretofore known systems involves errors in the measurement of electrical conductivity due to changes in temperature of the conducting medium. Since electrical conductivity varies markedly with the temperature of the conducting material (differently for different mediums), a measurement of electrical conductivity has little significance unless it is related to a specific temperature. Instruments without means of temperature compensation are of limited value.

Summary

The present invention is as implified, relatively inexpensive and improved electrodeless system for measuring te electrical conductivity of a conducting medium and which eliminates the need for immersing the toroidal cores or electrodes within the electrolyte or solution under investigation. A tubular closed loop is employed so constructed and arranged as to reduce the effect of external shunt resistance paths. Further, the present invention makes use of a system of minimum components and wiring complexity to achieve a highly efficient and accurate measurement of the electrical conductivity of the conducting medium being tested.

Brief description of the drawing

A detailed description follows in conjunction with a drawing, wherein.

In the two figures of the drawing the same parts are identified by the same reference numerals.

Detailed description

Figure 1:
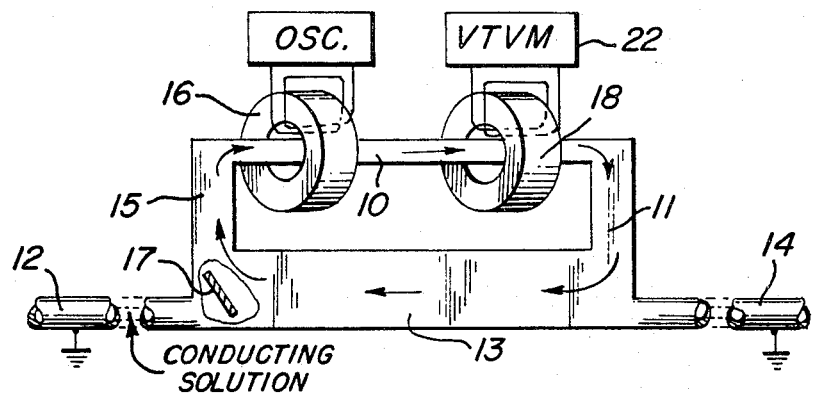
FIGS. 1 and 2 illustrate schematic and sectional views respectively of two different embodiments of the invention.

The apparatus for measuring the electrical conductivity illustrated in FIG. 1 utilizes a housing in the form of a closed loop having spaced inlet 14 and outlet 12 terminal pipes or conduits communicating therewith and in which the material flows as a result of the pressure exerted on the solution within inlet metallic terminal pipe or conduit 14. The loop-like housing is shown as having four legs or conduit sections 10, 11, 13 and 15. The direction of the current $i$ set up in the solution as a result of excitation of the driver coil 16 is shown by the arrows. If desired, one or more deflector baffle plates 17 of insulation material may suitably be positioned within the housing, as shown, to eliminate any possibility of flow stagnation and to ensure a continuous flow of solution through the conduit 10 passing through the hollow interiors of the toroidal cores. The interior diameter or cross-sectional area of leg or conduit section 13 is made larger than the diameter or cross-sectional area of conduit section 10 in order to offer a path of lower resistance to that part of the current $i$ which would otherwise flow through ground from terminal pipe 14 to terminal pipe 12. Because of the relatively small interior diameter of terminal pipes 12 and 14, the resistances thereof to the flow of current $i$ are much greater than the path of resistance through leg 13 of larger cross-sectional area and legs 15, 10 and 11.

Figure 2:
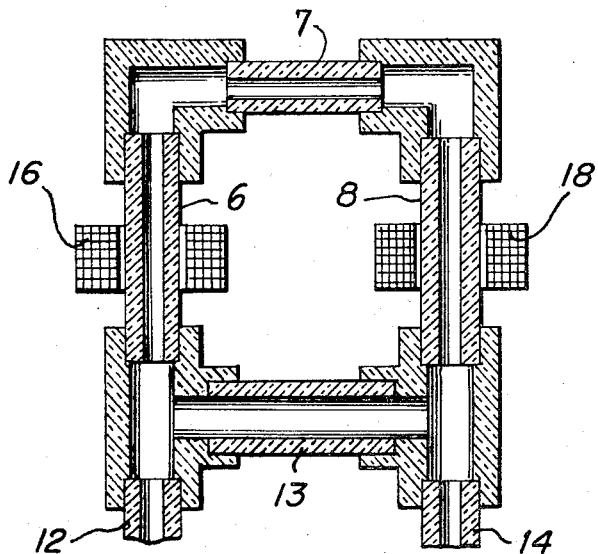

FIG. 2 is a modification of FIG. 1 and shows a tubular loop assembly or construction which is closed on itself and made of Teflon, and which the embodiment of FIG. 1 may take. The toroidal coils 16 and 18 are shown placed on different legs 6 and 8, but since the inner diameters of these legs 6 and 8 are the same and the solution flows through the closed loop in the same direction, the effect is the same as that described in connection with FIG. 1. The upper leg 7 and two side legs 6 and 8 of FIG. 2 have smaller internal diameters than the lower leg 13 to reduce the effect of external shunt resistance paths, and the cross-sectional area of leg 13 is larger than the cross-sectional areas of the inlet and outlet conduits 14 and 12.

I claim:

1. Apparatus for measuring the conductivity of a conducting medium capable of flowing, a tubular loop closed on itself and through which said medium is adapted to flow, said loop having a first section coupled to a second section of larger cross-sectional area than said first section, spaced inlet and outlet conduits coupled to said loop at the respective junctions of said first and second sections and in fluid communication with said loop, said inlet and outlet conduits each having a smaller cross-sectional area than one of said sections, a pair of spaced toroidal coils surrounding different portions of said first section, a source of alternating current coupled to one of said coils and an electrical measuring device coupled to the other coil of said pair.

2. Apparatus in accordance with claim 1, wherein the cross-sectional areas of both inlet and outlet conduits are smaller than the cross-sectional area of said second section.

3. Apparatus for measuring the conductivity of a solution, comprising a conduit through which said solution is adapted to flow, a toroidal coil surrounding a region of said conduit for setting up an alternating current in the solution within said conduit, and another toroidal coil spaced from said first coil and surrounding another region of said conduit and responsive to said current for setting up an alternating current voltage, said conduit forming part of a tubular complete loop assembly having an inlet for injecting said solution into said loop assembly and an outlet for enabling said solution to flow out from said loop assembly, a portion of said loop assembly between said inlet and outlet having a diameter larger than the diameter of all other portions of said conduit and also larger than the diameters of said inlet and outlet, and an alternating current device coupled to and responsive to the voltage set up in said other coil for enabling an indication of the conductivity of said solution to be made.

4. A system according to claim 3, wherein the walls of said tubular loop assembly are made of electrical insulation material.

5. Apparatus for measuring the conductivity of a solution, comprising a conduit through which said solution is adapted to flow, said conduit comprising a tubular loop assembly having a first leg and a second leg parallel to said first leg but of larger cross-sectional area than the cross-sectional area of the first leg, a toroidal coil surrounding a region of said first leg for setting up an alternating current in the solution within said conduit, and another toroidal coil spaced from said first coil and surrounding another region of said first leg and responsive to said current for setting up an alternating current voltage, an inlet for injecting said solution into said loop assembly and an outlet for enabling said solution to flow out from said loop assembly, said second leg being between said inlet and outlet and having a cross-sectional area larger than the cross-sectional areas of said inlet and outlet, and a voltage measuring device coupled to and responsive to the voltage set up in said other coil for enabling an indication of the conductivity of said solution to be made.

6. A system according to claim 5, wherein said loop assembly is rectangular in shape and has four tubular legs, is made of electrical insulation material, and said toroidal coils surround oppositely positioned third and fourth tubular legs of said assembly, the cross-sectional areas of said third and fourth legs being the same and smaller than the cross-sectional area of said second leg.

7. Apparatus according to claim 5, wherein said tubular complete loop is in the general form of a rectangle having upper and lower legs and two side legs, said upper leg and two side legs having smaller internal diameters than the lower leg, said toroidal coils surrounding respectively said two side legs.

References Cited

UNITED STATES PATENTS

| | | |
|---|---|---|
| 2,709,785 | 5/1955 | Fielden. |
| 2,542,057 | 2/1951 | Relis _____ 324—30 |
| 3,078,412 | 2/1963 | Blake _____ 324—30 X |

RUDOLPH V. ROLINEC, *Primary Examiner.*

C. F. ROBERTS, *Assistant Examiner.*